W. Clissold,
Wool Oiling Machine.

No. 41,764. Reissued Sep. 13, 1864.

Witnesses.
Thos. R. Roach
P. B. Fischmacher.

Inventor.
Wm Clissold
by his attorney
Sam Cooper

N. PETERS, PHOTO-LITHOGRAPHER, WASHINGTON, D. C.

UNITED STATES PATENT OFFICE.

GEORGE S. HARWOOD AND GEORGE H. QUINCY, OF BOSTON, MASSACHUSETTS, ASSIGNEES OF WILLIAM CLISSOLD.

IMPROVEMENT IN MACHINES FOR OILING WOOL.

Specification forming part of Letters Patent No. 36,603, dated February 24, 1862; Reissue No. 1,764, dated September 13, 1864.

*To all whom it may concern:*

Be it known that WILLIAM CLISSOLD, of Dudbridge Works, Stroud, in the county of Gloucester, in that part of the United Kingdom of Great Britain and Ireland known as England, patent-machine manufacturer, has invented certain Improvements in Oiling Wool; and we do hereby declare that the following is a full and exact description of the said invention.

This invention relates to the operation of supplying oil or oleaginous mixtures to wool preparatory to its being submitted to the carding-engine and while being fed thereto, for the purpose of being worked into sliver; the object of this invention being to effect a uniform and equable distribution of the liquid through the mass of fibers under operation and prevent the waste of oil, labor, and time that is consequent on the mode of oiling wool heretofore practiced. To this end a pressure-roller is used, mounted above the feed-apron of a carding-engine, to which the wool is supplied in the usual manner. This pressure-roller, receiving oil from a suitable reservoir through the intermediary of a traveling brush or brushes, and dipping plate or plates which supply the brush or brushes with the requisite quantity of oil, will insure the equable distribution of the oil over the whole surface of the wool as it is passed under it and in contact therewith.

Figure 2:
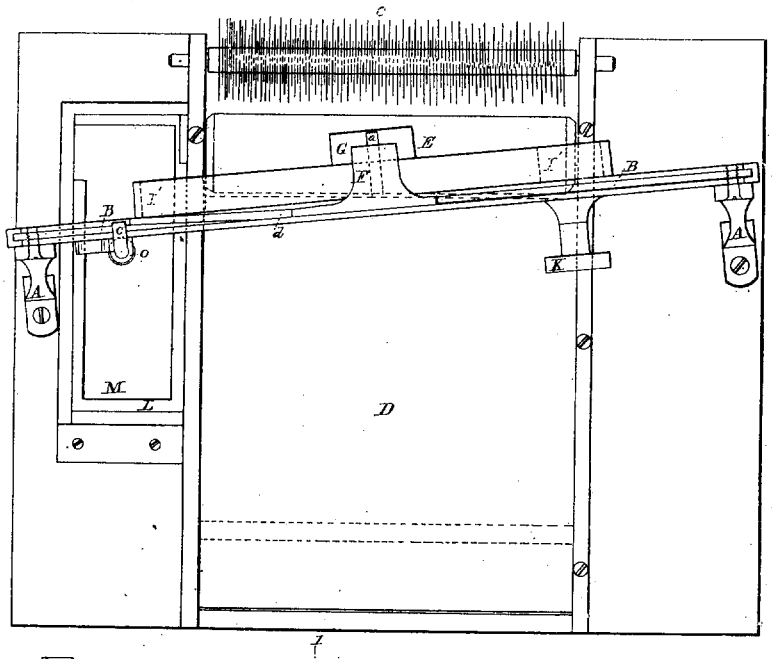
Figure 1:
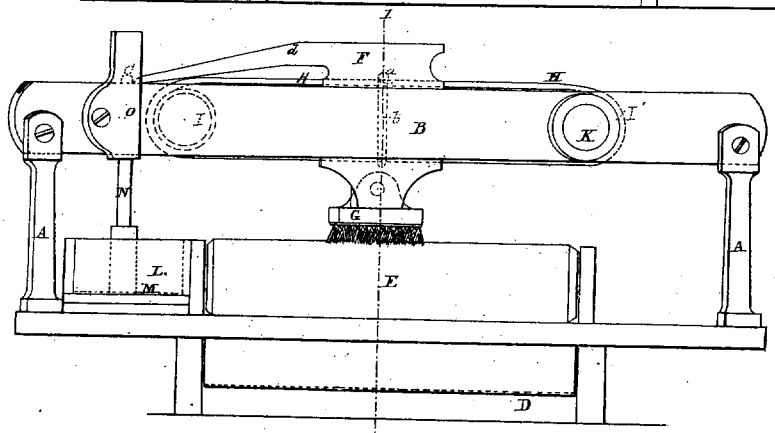
Figure 3:
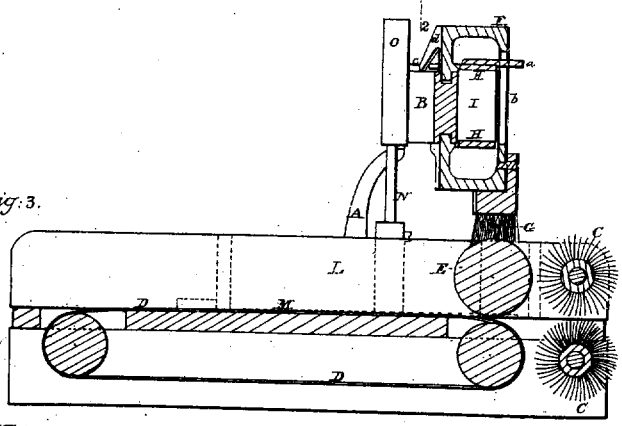

In the accompanying drawings, Figure 1 represents in front elevation the improved oiling apparatus as applied to a carding-engine. Fig. 2 it a plan view of the same, and Fig. 3 is a vertical cross-section on the line 1 2 of Fig. 1.

A A are two standards, which support a horizontal cross-bar, B, set in advance of the feed-rollers C C of the carding-engine. This bar stretches across the feed-apron D of the engine, and is set at an angle to the feed-rolls. Below this bar (and revolving in contact with the wool placed on the feed-apron) is a metal roller, E, which has its bearings in the side framing of the engine, and is intended to distribute oil to the wool. The bar B forms a rail for the traverse of a carriage, F, which carries a brush, G, by which it is intended to transmit the oleaginous mixture to the oil-distributing roller E. H is a belt passing over the drums or pulleys I I′, having their bearings in the cross-bar B. The driving-wheel K is placed on the shaft which carries the drum I′. A continuous rotary motion is by this arrangement communicated from the driving-wheel to the endless belt H.

The traverse of the brush-carriage is effected by means of a pin, *a*, fastened to the outside face of the endless belt moving in a slot, *b*, in the back of the carriage F.

We will now describe the manner of supplying the brush with oil.

At one side of the engine, and immediately below the pulley I, is a reservoir, L, for containing the oleaginous mixture, and into this reservoir dips a plate, M, which is carried by a rod, N, that slides freely in a guide, *o*, provided for it on the face of the bar B, and is adjusted vertically upon that rod. The upper end of the rod N terminates in a bent arm, *c*, which projects over the top edge of the bar 13, and is raised or lowered by an incline, *d*, attached to the top of the carriage F. As the carriage comes to the end of its traverse, the incline *d* will pass under the bent arm *c* of the rod N and cause it to rise with the rod until the dipping-plate M has moved out of the oil mixture and brought up a determinate quantity upon its upper surface. The carriage F, in completing its traverse, will carry the brush over this plate and cause it to take up a charge of oil therefrom. The carriage will then return, and, passing diagonally over the rotating roller E, will lay a thin film of oil over the upper surface of the roller, a fresh surface being constantly presented to the traversing brush. By a continuous repetition of this action the whole periphery of the roller will be evenly and uniformly oiled, and as the roller revolves it will press the oil into the wool that is being fed to the carding-engine in regulated quantities, as is well understood.

The friction between the traveling wool and the lower part of the roller will be sufficient to secure a regular axial motion thereto. If found desirable, an oil-reservoir and dipping-plate may be provided at both sides of the machine. In such case a double wedge will be required on the brush-carriage to operate alternately on the two dipping-plate rods.

When two brushes are used, they are connected directly to the endless belt.

As the action of the dipping-plate is to plunge into and rise quickly out of the oiling liquid, it will impart to that liquid the requisite agitation for maintaining the intimate admixtures of the ingredients.

Having now set forth the nature of the said invention and the manner in which the same is or may be performed, what we claim as the invention of the said WILLIAM CLISSOLD is—

1. The oiling of wool by means of a pressure-roller supplied with oil or oleaginous mixture, in the manner substantially as set forth.

2. A machine or apparatus for oiling wool, consisting of the following elements combined: first, one or more reservoirs for containing the oil or oleaginous mixture; second, a dipper or dippers and a brush or brushes, the former to carry and the latter to receive the determinate and requisite quantity of oil or oleaginous mixture; third, a distributer or distributers, receiving oil or oleaginous mixture from the brush or brushes and transferring it to the wool, substantially as set forth.

3. The combination, with an oil-reservoir and intermediate dipper and brush, or other equivalent device, for conveying oil in requisite quantities to the distributer, of a pressure-roller arranged immediately in front of the feed-rollers above the feed-apron of a carding or other wool-preparing machinery, substantially as set forth.

4. In a wool-oiling apparatus in which the wool is oiled by imprinting the oil, as described, in combination with a pressure-roller or the equivalent thereof, a brush or brushes charged with oil by means of one or more dipping-plates, substantially as set forth.

5. The combination, with one or more oil-reservoirs and traveling brush or brushes, of a plate or plates for charging the said brush or brushes with the requisite amount of oil, and when arranged for action so as to properly agitate the oil or oleaginous mixture, substantially as set forth.

6. In combination with a distributing pressure-roller, a brush traveling diagonally over the said roller—that is to say, at an angle with the axis of but in a tangent to the roller—substantially as and for the purposes set forth.

In testimony whereof we have signed our names to this specification before two subscribing witnesses.

GEO. S. HARWOOD.
GEO. H. QUINCY.

Witnesses:
CHAS. B. F. ADAMS,
A. W. AUAMS.